(12) United States Patent
Hooker et al.

(10) Patent No.: US 7,104,282 B2
(45) Date of Patent: Sep. 12, 2006

(54) TWO STAGE SOLENOID CONTROL VALVE

(75) Inventors: Kenneth Hooker, North Madison, CT (US); James Mutch, Canton Center, CT (US); Robert Franconi, New Hartford, CT (US); Bob Goodman, West Hartford, CT (US)

(73) Assignee: Honeywell International, Inc., Morristown, NJ (US)

( * ) Notice: Subject to any disclaimer, the term of this patent is extended or adjusted under 35 U.S.C. 154(b) by 140 days.

(21) Appl. No.: 10/648,457

(22) Filed: Aug. 26, 2003

(65) Prior Publication Data

US 2005/0044858 A1  Mar. 3, 2005

(51) Int. Cl.
*G05D 16/20* (2006.01)
*F16K 31/40* (2006.01)
*F02C 6/08* (2006.01)

(52) U.S. Cl. .............. 137/625.64; 137/495; 251/30.01; 251/63.5

(58) Field of Classification Search ........... 137/624.64, 137/625.64, 494, 495; 251/62, 63.5
See application file for complete search history.

(56) References Cited

U.S. PATENT DOCUMENTS

| | | | | |
|---|---|---|---|---|
| 2,850,685 A | * | 9/1958 | Ray ...................... | 251/129.09 |
| 2,912,007 A | * | 11/1959 | Johnson ................. | 137/625.64 |
| 2,913,005 A | * | 11/1959 | Grant et al. ............. | 137/625.6 |
| 3,126,915 A | * | 3/1964 | Hunt ..................... | 137/625.64 |
| 3,896,840 A | | 7/1975 | Anderson | |
| 3,916,952 A | * | 11/1975 | Pauliukonis ........... | 137/625.64 |
| 4,305,566 A | | 12/1981 | Grawunde | |
| 4,567,914 A | * | 2/1986 | Coppola et al. ........ | 137/625.64 |
| 4,576,200 A | | 3/1986 | Janecke et al. | |
| 5,117,868 A | * | 6/1992 | Wagner ................. | 137/625.64 |
| 5,417,402 A | | 5/1995 | Speybroeck | |
| 5,522,431 A | | 6/1996 | Bonacorsi et al. | |
| 5,570,721 A | | 11/1996 | Funke et al. | |
| 5,645,263 A | | 7/1997 | Aardema | |

FOREIGN PATENT DOCUMENTS

| | | |
|---|---|---|
| EP | 0 999 488 A2 | 5/2000 |
| GB | 2 266 579 A | 11/1993 |
| WO | PCT/US2004/027724 | 1/2005 |

* cited by examiner

*Primary Examiner*—Ramesh Krishnamurthy
(74) *Attorney, Agent, or Firm*—Ingrassia Fisher & Lorenz

(57) ABSTRACT

A two stage solenoid control valve is described. The control valve opens and closes using a single source of pressurized fluid. This source of pressurized fluid may be transmitted through the solenoid control valve and on to a downstream valve such as a bleed valve in a gas turbine engine.

11 Claims, 2 Drawing Sheets

TWO STAGE SOLENOID CONTROL VALVE

This application is related to U.S. patent application Ser. No. 10/625,295 entitled "Bleed Valve System."

FIELD OF THE INVENTION

The present invention relates to solenoid valves, and more particularly to solenoid valves used for system control in gas turbine engines. In particular the present invention relates to two stage solenoid control valves used to provide activating pressure to compressor bleed valves within gas turbine engines.

BACKGROUND OF THE INVENTION

Gas turbine engines such as those used in industrial, marine, vehicle, and aerojet applications, may include multiple stages of compressors. In a typical arrangement air is first drawn over a first compressor stage that elevates the air pressure to a desired level. The air, while passing in a generally axial direction through the engine, then crosses successive compressor stages that further raise the air pressure.

It has been found that bleed valves can be used at various points on a gas turbine engine to assist in maintaining a desired level of air pressure within the engine. One point in a gas turbine engine where bleed valves are used is in the various compressor stages. Thus a bleed valve or valves may be used to control undesired effects such as engine surge. It is also desirable to activate bleed valves used in turbine engines with a pressure source drawn from a turbine engine compressor stage.

Solenoid control valves may be used to activate gas turbine bleed valves. Additionally, solenoid-activated control valves may be used in a variety of applications to regulate fluid control. Generally, solenoid activated valves are useful in that they may be controlled by electronic or computerized control systems. An electronic control system may itself provide the command to provide the electrical current that activates a solenoid valve. The electronic and computerized control is a useful feature in gas turbine engine control systems.

While certain valve designs are known that use solenoid activation, there is need for an improved design.

Weight considerations are significant criteria in control valve design. Especially in those gas turbine engines intended for use in aerojet applications, it is desired that weight be minimized. Thus it is desired that a solenoid control valve be provided that has a weight lower than control valves now available.

One function of the solenoid control valve is to pass an activating force, often a pressurized fluid such as air, through the solenoid valve and onto the bleed valve. It is desired that the activating force/pressurized fluid also provide the force necessary to open and close the solenoid valve. Thus there is a need for a solenoid control valve that can be opened and closed using a single source of activating pressure from the same pressurized fluid that is passed through the solenoid control valve.

Another important criteria in a solenoid control valve, and particularly one used to control bleed valve operation in a gas turbine engine, is response time. A quick response time is desired.

Reliability of design is another important criteria in a solenoid control valve. A design with minimum moving parts is preferred in order to lessen the need for maintenance or the chance of breakdown. What moving parts are used should be robust and simple in function. Redundancy is also a desired feature in a control valve, particularly in aerojet applications. With duplicate or redundant features, even in the event of a partial system failure, the valve will nevertheless continue to perform as desired.

An additional feature that is important in the design of a solenoid control valve is how the valve will interact with a downstream valve. Where, for example, a compressor bleed valve is connected downstream from a solenoid control valve, the design of the solenoid control valve must make allowance for the bleed valve to compress and decompress. Thus, it is a desirable feature that a flow through solenoid control valve permit pressure that is passed downstream to a bleed valve, or other type of valve, to pass back through the solenoid control valve when the downstream valve deactivates and/or decompresses.

The solenoid control valve is in the closed position during the majority of time when the engine is running. Thus, it is desired that the de-energized position of the solenoid control valve correspond to the closed position of the valve.

Hence there is a need for a solenoid control valve that addresses one or more of the above-noted objectives. That is there is a need for a solenoid control valve of minimal weight and/or with a quick response time and/or with good reliability and/or that can operate with a single pressure as the pressure supply and/or a solenoid control valve that is closed in the de-energized position. The solenoid control valve embodiment disclosed herein addresses one or more of these needs.

SUMMARY OF THE INVENTION

The present invention provides a solenoid control valve that is light in weight, operates with a single supply source of pressurized fluid, has a quick response time, is reliable, robust and simple in design with minimal moving parts, and is closed in the de-energized state.

In one embodiment of the present invention, and by way of example only, a solenoid control valve for use in providing pressure control to a gas turbine bleed valve is provided. The solenoid control valve includes a housing that has a supply inlet, a major channel, a minor channel, and a vent to provide fluid communication within the housing. A pilot ball valve is disposed within this housing. An arm is disposed within the housing having freedom to move and the arm is capable of contacting and moving the ball of the pilot ball valve. A dual coil solenoid is disposed within the housing; the dual coil solenoid is capable of having an energized mode and a de-energized mode. The dual coil solenoid is configured so as to move the arm when in the energized mode. Biasing means are positioned within the dual coil solenoid so as to tend to force the arm against the ball. This action thereby tends to restrict fluid movement through the pilot ball valve. Finally, an actuator chamber is provided in fluid communication with the housing through the minor channel and the major channel; the actuator chamber further has a control port and an outlet port. An actuator is moveably positioned within the actuator chamber. The actuator has a major surface, a minor surface, a fill seat, and a vent seat. Preferably, the major surface and minor surface are configured so that fluid pressure admitted through the supply inlet passes through the major channel to act on the major surface and fluid pressure also passes through the minor channel to act on the minor surface. This fluid pressure causes movement of the actuator.

In yet another exemplary embodiment, a method is provided for regulating passage of fluid pressure in a gas turbine engine. The method includes the steps of: providing fluid pressure to a housing through a supply inlet such that the fluid pressure is restricted from flowing through a pilot ball valve positioned in the housing; energizing a dual coil solenoid thereby moving an arm so that the ball of the pilot ball valve is allowed to move within the pilot ball valve; passing fluid pressure through the pilot ball valve and through a major channel whereby the fluid pressure acts on a major surface of an actuator; passing fluid pressure through a minor channel whereby said fluid pressure acts on a minor surface of an actuator; and moving the actuator into an open position whereby fluid pressure is allowed to flow through a control port.

Other independent features and advantages of the solenoid control valve will become apparent from the following detailed description, taken in conjunction with the accompanying drawings which illustrate, by way of example, the principles of the invention.

DETAILED DESCRIPTION OF A PREFERRED EMBODIMENT

Reference will now be made in detail to exemplary embodiments of the invention, examples of which are illustrated in the accompanying drawings. Wherever possible, the same reference numbers will be used throughout the drawings to refer to the same or like parts.

Figure 1:
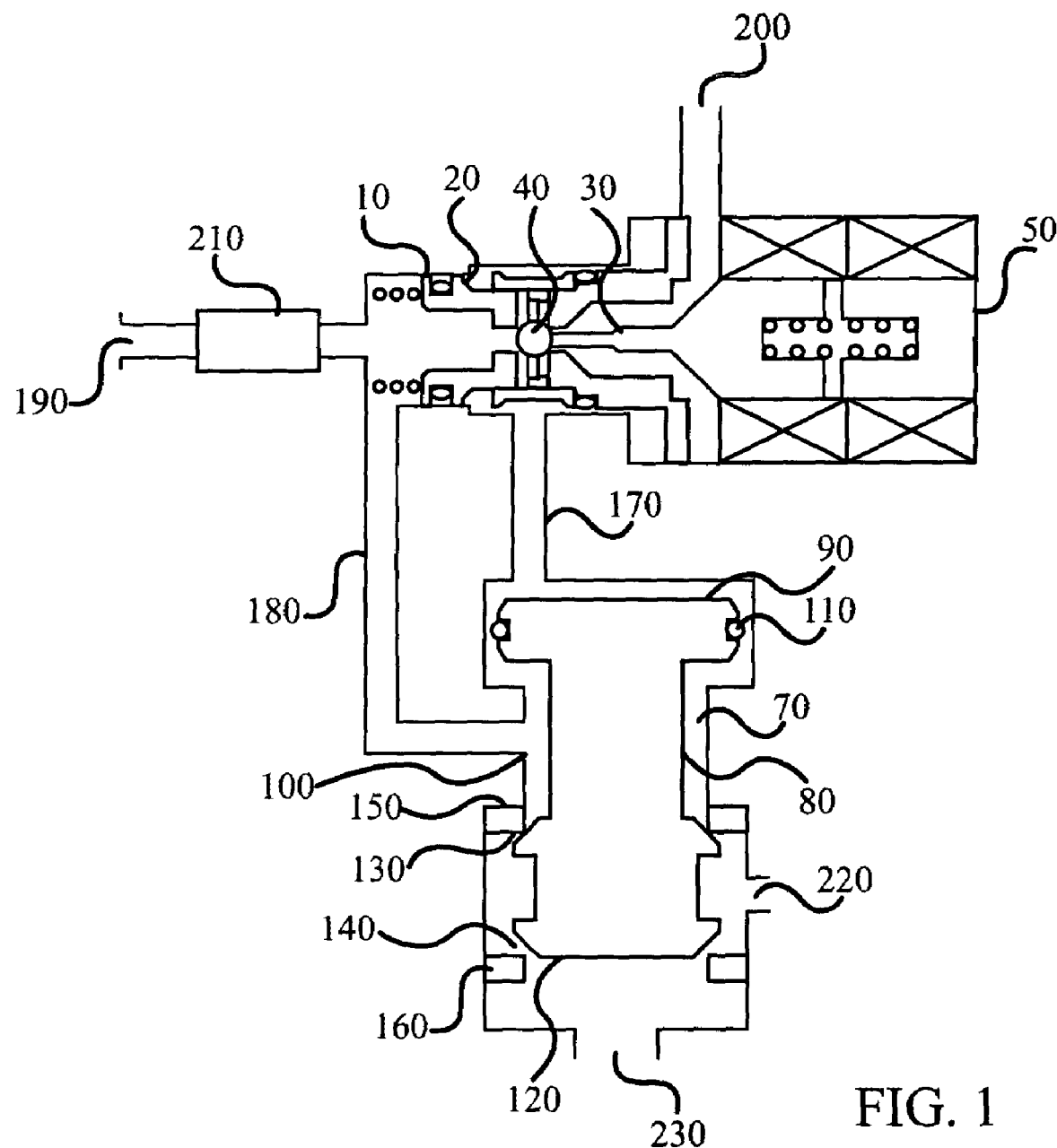
FIG. 1 is a perspective view of a solenoid control valve in accordance with an embodiment of the invention.

Referring now to FIG. 1 there is shown a schematic view of an embodiment of the solenoid control valve. A preferred embodiment of the solenoid control valve includes housing 10. Housing 10 is a surrounding structure that defines a cavity or hollow area. Fluid may pass through housing 10 and other elements may be positioned within housing 10. Disposed within housing 10 is pilot valve 20 and activating arm 30. Pilot valve 20 includes ball 40. Activating arm 30 is also attached to solenoid array 50, and biasing means 60 is disposed within solenoid array 50. Preferably biasing means 60 comprises a spring.

Housing 10 may itself be constructed from single or multiple pieces. In one embodiment, housing 10 comprises a casting with a face plate attached to the casting. In another embodiment, housing 10 comprises separate units that are bolted, welded, fitted, or otherwise joined together. Separate units may include a coil assembly, a pilot valve assembly, and an activator assembly. As is known in the art, both magnetic and non-magnetic materials may be used to fashion housing 10 so as not to enhance the magnetic and electrical properties of the solenoid coil.

Solenoid array 50 may include electrical cables, windings, armature and insulation. Solenoid array 50 take on an energized state or mode when current is passed through the windings thereon. Conversely, solenoid array 50 is in a de-energized state or mode when current is not passing through the windings. As is known in the art, solenoid array 50 includes a hollow space to receive concentrated magnetic force. A moveable piece such as a plunger may be positioned within the hollow space that will move when the solenoid array is energized. The plunger (not shown) may be used in conjunction with activating arm 30; preferably the plunger is of a design and material to efficiently translate the magnetic force in solenoid array 50 to mechanical force. Where a plunger is used, activating arm 30 receives the mechanical force of the plunger.

Preferably solenoid array 50 comprises a dual coil, redundant solenoid. In this manner the reliability of the solenoid control valve is enhanced. In the event one solenoid should fail, a second solenoid nevertheless may operate so as to activate the valve. As shown in FIG. 1, where a dual coil design is illustrated, solenoid array includes a first and second solenoid that are adjacently positioned. Both solenoids translate mechanical energy in the same direction. Thus, should one of the two solenoids fail, the other still provides sufficient force to activate the valve. This redundancy is advantageous, particularly in aeronautical applications.

Actuator chamber 70 is also included in the invention. In one embodiment actuator chamber 70 is formed by walls or a housing structure; actuator chamber 70 is an open volume or space. Housing 10 is in fluid communication with actuator chamber 70. Actuator 80 is disposed within actuator chamber 70 and is free to move in a reciprocal, linear motion within chamber 70. In a preferred embodiment housing 10 and actuator chamber 70 may be a unitary piece or construction. In that form of construction housing 10 and actuator chamber 70 are two parts of one piece.

Actuator 80 includes several features which are now described. As shown in FIG. 1, preferably actuator 80 includes a major surface 90 and a minor surface 100. Sealing means 110 is preferably disposed on actuator 80 so as to contact walls of actuator chamber 70. Sealing means 110 thus divides regions of actuator chamber 70 between that region exposed to major surface 90 and that region exposed to minor surface 100. Preferably sealing means 110 comprises a teflon seal with a spring energizer. Other kinds of sealing means 110, such as carbon rings, polymer rings, composite rings, or metallized rings, for example may also be used. Sealing means 110 provides a significant contact with the walls of actuator chamber 70; however, it is not necessary that the degree of contact be an airtight or substantially airtight seal. A small degree of leakage is possible at sealing means 110. Preferably, a small, though not substantial leakage is allowed at sealing means 110; however the degree of leakage is not so significant as to impair good response time of actuator 80.

Actuator chamber 70 also includes openings for control port 220 and outlet port 230. Control port 220 and outlet port 230 are openings or ports that will permit fluid communication between actuator chamber 70 and other points outside the valve body. Pressurized fittings, tubes, and other pressure control fittings may attach to control port 220 and outlet port 230.

Actuator 80 further includes poppet 120. Poppet 120 includes fill seat 130 and vent seat 140. Likewise actuator chamber 70 includes fill contact 150 and vent contact 160. Actuator 80 is free to move such that fill seat 130 is brought into contact with fill contact 150 and so that vent seat 140 is brought into contact with vent contact 160. These points of contact define the extent of travel permitted to actuator 80. Actuator 80 is said to be open when vent seat 140 contacts vent contact 160; and actuator 80 is closed when fill seat 130 contacts fill contact 150.

Still referring to FIG. 1, it is shown that housing 10 and actuator chamber 70 are in fluid communication. In a preferred embodiment, major channel 170 and minor channel 180 provide fluid communication therebetween.

Housing 10 also has supply inlet 190 and vent 200 to provide fluid ingress and fluid egress, respectively, into and out of housing 10. Optionally and preferably, filter 210 is disposed upstream from supply inlet 190. In a preferred embodiment, where compressor air is admitted to housing 10 through supply inlet 190, filter 210 removes contaminants and other impurities in the air stream that may be damaging to the valve or other downstream devices.

Major channel 170 provides fluid communication between a fluid passing through pilot valve 20 to major surface 90 of actuator 80 in actuator chamber 70. This fluid acts on major surface 90. Minor channel 180 provides fluid communication between fluid that passes through housing 10 but that does not pass through pilot valve 20 but that instead passes to actuator chamber 70 where this fluid acts on minor surface 100 of actuator 80.

Having described the bleed valve system from a structural standpoint, a method of using such an assembly in operation will now be described.

Activating arm 30 can move between an energized/open position and a de-energized/closed position. At rest, or in a de-energized state or closed mode, biasing means 60 pushes activating arm 30 in an expanding direction so that activating arm 30 presses against ball 40. In this mode ball 40 presses against the pilot valve structure thus restricting the fluid path through pilot valve 20. When activating arm 30 is in the energized state or open mode, solenoid array 50 contracts thereby pulling activating arm 30 away from pilot valve 20 and ball 40. Fluid pressure introduced from supply inlet 190 acts on ball 40. Ball 40 is pressed against pilot valve 20 closer to activating arm 30. This opens a fluid communication through major channel 170 and to major surface 90. Simultaneously, fluid communication has already been established from supply inlet 190 through minor channel 180 and to minor surface 100. Fluid pressure acting on major surface 90 overcomes fluid pressure acting on minor surface 100. This pressure differential moves actuator 80 until vent seat 140 contacts vent contact 160. This movement of actuator 90 to an open position opens fluid communication to control port 220. Thus supply pressure originating at supply inlet 190 passes through minor channel 180 and out control port 220.

In a preferred embodiment, fluid pressure sent through control port 220 is directed to a further valve downstream, such as a bleed valve, to provide the activating pressure needed to operate the bleed valve.

When activating current is removed from solenoid array 50, solenoid array 50 changes to the de-energized mode. Biasing means 60 thereupon moves activating arm 30 into the closed position in which activating arm 30 pushes against ball 40 to close pilot valve 20. In this closed position, ball 40 restricts fluid travel from supply port 190 through major channel 170. Fluid continues to travel in from supply inlet 190 through minor channel 180 and into actuator chamber 70. At this location the fluid pressure impinges upon minor surface 100 of actuator 80. With pressure acting on minor surface 100 but removed from major surface 90, actuator 80 moves from the open to the closed position. As actuator 80 moves to the closed position, fill seat 130 of actuator 80 makes contact with fill contact 150. This contact restricts the further movement of actuator 80. Further the contact of fill seat 130 with fill contact 150 acts to restrict movement of fluid to control port 220 and outlet port 230.

In order to move to the closed position, actuator 80 releases pressurized fluid that had been acting on major surface 90 in order to open actuator 80. The pressurized fluid escapes by taking a route through major channel 170, pilot valve 20 and out vent 200. The pressurized fluid then escapes from housing 10 by exiting through vent 200. Preferably vent 200 is in fluid communication with a pressure less than that supplied to supply inlet 190, and preferably vent 200 is at the pressure surrounding the solenoid control valve. In an aerojet engine this would preferably be the atmospheric pressure surrounding the engine such as fan air.

Note that when actuator 80 moves to the closed position, control port 220 and outlet port 230 are in fluid communication. Preferably outlet port 230 vents to atmosphere surrounding the solenoid control valve. The fluid communication between control port 220 and outlet port 230 provides a pathway through which pressure from the valve downstream from control port 220 can escape. The pressure escape route thereby allows the downstream valve to depressurize and deactuate by releasing its pressure through outlet port 230.

Thus, by way of example, a compressor bleed valve may be connected downstream from a solenoid control valve where control port 220 provides the activating pressure to the bleed valve. When the solenoid control valve closes, thereby cutting off activating pressure to the bleed valve, the bleed valve may itself need to decompress in order to close. Bleed valve can release pressure and deactivate by sending the pressure back to control port 220 and allowing the pressurized fluid to escape via outlet port 230.

Advantageously, solenoid control valve opens and closes through a single pressurized fluid source admitted into the valve through supply inlet 190. Thus, in a preferred embodiment the solenoid control valve can use compressed air drawn from a compressor stage of a gas turbine engine as its source of supply for pressurized fluid.

Figure 2:
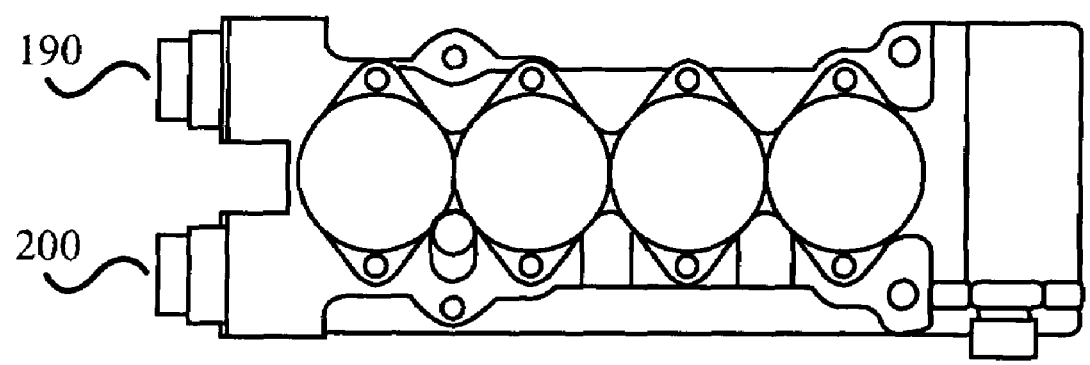
FIG. 2 is a perspective view of a bank of solenoid control valves for use in controlling bleed valves in a gas turbine engine.

As has been stated at several points, one preferred use of the solenoid control valve is in aerojet turbine engines as a control valve for a downstream bleed valve. Often bleed valves used in such an application are arrayed in sets at various compressor points of the engine. For example a high pressure compressor stage may have three or four bleed valves positioned at various radial positions around the compressor stage. In a preferred embodiment, one solenoid control valve is pneumatically linked with each bleed valve. If an engine has a set of bleed valves it will also need a set of solenoid control valves. Thus, as shown in FIG. 2, a set of solenoid control valves may be positioned in a bank or manifold. In this configuration it is preferred that a single supply inlet 190 provides the source of pressurized fluid that activates each individual solenoid valve. Thus, in the manifold configuration, there is preferably a single inlet of pressurized fluid, for example compressor air, input to the manifold. Of course, multiple inlets can also be configured. Also, in the manifold configuration, a single vent 200 is also preferably provided at the manifold that vents each solenoid valve. But again, individual vents may also be provided for each valve.

One advantage of the solenoid control valve described herein is the weight savings that may be realized both from the individual valve design and from the manifold arrangement thereof.

A further advantage of the solenoid control valve is that the activating force/pressurized fluid which the valve controls also provides the force necessary to open and close the solenoid valve. Thus the solenoid control valve is opened and closed using a single source of activating pressure from the same pressurized fluid that is passed through the solenoid control valve.

Still a further advantage of the solenoid control valve, and particularly one used to control bleed valve operation in a gas turbine engine, is a quick response time.

Another advantage of the solenoid control valve is the reliability of design with minimum moving parts and simplicity in function. Redundancy in design, with duplicate or redundant features, also provides advantage.

It is also advantageous hat the flow through solenoid control valve permits pressure that is passed downstream to a bleed valve, or other type of valve, to pass back through the solenoid control valve when the downstream valve deactivates and/or decompresses.

The solenoid control valve described herein remains in the closed position during the majority of time when the engine is running. The de-energized position of the solenoid control valve corresponds to the closed position of the valve which advantageously helps to extend the life and reliability of the valve.

The materials that are used to construct the solenoid control valve described herein are those materials suitable for use in gas turbine engines, and especially including those materials suitable for aerojet turbine engines. Preferred materials include Inconel alloys.

The solenoid control valve has occasionally been described as capable of being used in a control system with bleed valves in a gas turbine engine. It should be appreciated, however, that while the solenoid control valve is suitable for such an application, the solenoid control valve described herein is not restricted to use in any specific kind of engine or control system. The solenoid control valve may be applied to other control applications and systems.

Further, while the invention has been described with reference to a preferred embodiment or embodiments, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A solenoid control valve for use in supplying pressure control to a gas turbine bleed valve, comprising:
    a housing having a supply inlet, a major channel, a minor channel, and a vent;
    a ball pilot valve disposed within said housing and movable between at least (i) a closed position, in which the supply inlet is in fluid communication with the minor channel, and the major channel is in fluid communication with the vent, and (ii) an open position, in which the supply inlet is in fluid communication with the major channel and the minor channel, and the major channel is not in fluid communication with the vent;
    an activation arm moveably disposed within said housing, said activation arm configured to move said pilot ball valve between the open and closed positions;
    a dual coil solenoid disposed within said housing, said solenoid adapted to receive a current and configured, upon receipt thereof, to move said activation arm to a position that moves said ball pilot valve to its open position;
    biasing means positioned within said dual coil solenoid and configured to bias said ball pilot valve toward its closed position;
    an actuator chamber in fluid communication with said housing via said minor channel and said major channel, said actuator chamber having a vent contact and a fill contact disposed therein, and further including a control port, and an outlet port; and
    an actuator positioned within said actuator chamber, said actuator having a major surface coupled to a poppet, said poppet defining a minor surface having a fill seat and a vent seat disposed thereon, the actuator movable between at least (i) a first position, in which the poppet vent seat contacts the vent contact, and the minor channel, the actuator chamber, and the control port are in fluid communication with each other, and (ii) a second position, in which the poppet fill seat contacts the fill contact, the control port and the outlet port are in fluid communication with each other, and the major channel, the minor channel, and the actuator chamber are each isolated from both the control port and the outlet port.

2. The solenoid valve of claim 1 wherein said major surface and minor surface are configured whereby fluid pressure admitted through said supply inlet passes through said major channel to act on said major surface and passes through said minor channel to act on said minor surface to cause movement of said actuator between the first and second positions.

3. The solenoid valve of claim 2 wherein the movement of said actuator stops when said vent seat contacts said vent contact.

4. The solenoid valve of claim 2 wherein the movement of said actuator opens fluid communication between said supply inlet and said control port.

5. The solenoid valve of claim 1 wherein fluid pressure admitted through said supply inlet passes through said minor channel and is restricted from passing through said pilot ball valve so that fluid pressure acts on said minor surface of said actuator thereby to cause movement of said actuator.

6. The solenoid valve of claim 5 wherein the movement of said actuator stops when said fill seat contacts said fill contact.

7. The solenoid valve of claim 5 wherein fluid pressure acting against said major surface of said actuator is released through said vent of said housing.

8. The solenoid valve of claim 5 wherein said control port and said outlet port of said actuator chamber are in fluid communication when said fill seat of said actuator contacts said fill contact.

9. The solenoid valve of claim 1 further comprises a filter to filter air admitted into said housing through said supply inlet.

10. The solenoid valve of claim 1 wherein said pilot ball valve is configured so that when said dual coil is in the deenergized mode, said biasing means moves said arm against said ball thereby restricting fluid passage through said pilot ball valve.

11. The solenoid valve of claim 1 wherein said pilot ball valve is configured so that when said dual coil is in the energized mode said ball is free to move within said pilot valve so that fluid pressure from said supply inlet causes said ball to move thereby permitting fluid passage through said pilot ball valve.

* * * * *